United States Patent [19]
Rinckel

[11] Patent Number: 6,141,961
[45] Date of Patent: Nov. 7, 2000

[54] EXHAUST ELEMENT WITH HEAT EXCHANGER

[75] Inventor: Francis Rinckel, Champey, France

[73] Assignee: ECIA-Equipments et Composants pour l'Industrie Automobile, Audincourt, France

[21] Appl. No.: 09/265,380

[22] Filed: Mar. 10, 1999

[30] Foreign Application Priority Data

Mar. 11, 1998 [FR] France .................................. 98 02991

[51] Int. Cl.[7] ...................................................... F01N 3/00
[52] U.S. Cl. ............................... 60/288; 60/287; 60/298; 60/320; 60/274; 123/119 A
[58] Field of Search ............................ 60/288, 287, 298, 60/320, 274; 123/119 A

[56] References Cited

U.S. PATENT DOCUMENTS

| | | | |
|---|---|---|---|
| 3,228,185 | 1/1966 | Bergstrom et al. | 60/320 |
| 3,677,239 | 7/1972 | Elkins | 123/119 A |
| 4,023,360 | 5/1977 | Wossner et al. | 60/288 |
| 4,685,292 | 8/1987 | Brigham et al. | 60/320 |
| 5,983,628 | 11/1999 | Borroni-Bird et al. | 60/274 |
| 5,987,885 | 11/1999 | Kizer et al. | 60/298 |

FOREIGN PATENT DOCUMENTS

| | | |
|---|---|---|
| 914 450 | 5/1954 | Germany . |
| 35 09 016 | 9/1985 | Germany . |
| 296 11 034 U | 10/1997 | Germany . |
| 297 14 478 U | 11/1997 | Germany . |
| 0159713 | 9/1987 | Japan ...................................... 60/288 |
| 0210212A | 9/1987 | Japan ...................................... 60/288 |

Primary Examiner—Thomas Denion
Assistant Examiner—Thai-Ba Trieu
Attorney, Agent, or Firm—Sughrue, Mion, Zinn Macpeak & Seas, PLLC

[57] ABSTRACT

The invention relates to an exhaust element (10) of a motor vehicle with an internal-combustion engine. It includes a main exhaust pipe (16) and a bypass (18) mounted in parallel with the main exhaust pipe (16). The bypass (18) includes a heat exchanger (20). Moveable means (28) for shutting off the main pipe (16) and moveable means (30) for regulating the cross section offered for the gases to pass in the bypass (18) are arranged in the exhaust element. It further includes mechanical means (32) for synchronizing the means (28) for shutting off the main pipe (16) and means (30) for regulating the cross section for the gases to pass in the bypass (18), under the control of a single actuating element.

11 Claims, 4 Drawing Sheets

EXHAUST ELEMENT WITH HEAT EXCHANGER

BACKGROUND OF THE INVENTION

The present invention relates to an exhaust element of the type including a main exhaust pipe and a bypass mounted in parallel with the main pipe, which bypass includes a heat exchanger, and in which are arranged moveable means for shutting off the main pipe and moveable means for regulating the cross section offered for the gases to pass in the bypass.

Such an exhaust element is described, for example, in the European patent EP-B-0.058.842.

This exhaust element is intended to take up the heat from the exhaust gases coming from the internal-combustion engine of a motor vehicle so as to transfer this heat into the liquid cooling circuit of the engine.

This thermal transfer is particularly useful when starting up the vehicle from cold, so as to make it possible rapidly to obtain a substantial temperature in the liquid-cooling circuit of the engine. This is because this circuit for cooling the engine is also used for heating the passenger compartment of the vehicle.

Hence, it is known, by virtue of the means for shutting off the main exhaust pipe, to force the exhaust gases to flow through the bypass enclosing the heat exchanger. Moreover, it is known, so as to promote the heat exchange, to adjust the pressure in order to increase the temperature of the gases in the exchanger by virtue of the means for regulating the cross section offered for the exhaust gases to pass in the bypass.

In the known devices described particularly in the patent EP-B-0.058.842, the means for shutting off the main pipe are formed by a valve arranged in the main pipe. The means for regulating the passage cross section are formed by a three-way valve arranged in the bypass. The latter includes two separate sub-paths offered selectively for the exhaust gases to pass on the basis of the position of the three-way valve.

The valve arranged in the main pipe and the three-way valve provided in the bypass are controlled independently of one another by two separate actuators.

The structure of the exhaust element is thus complex to produce industrially, and the exhaust element requires several actuators to be used to control it.

SUMMARY OF THE INVENTION

The purpose of the invention is to propose an exhaust element which is simple to produce, inexpensive and which can be controlled easily and for a low cost.

To this end, the subject of the invention is an exhaust element of the abovementioned type, characterized in that it includes mechanical means for synchronizing the means for shutting off the main pipe and means for regulating the cross section for the gases to pass in the bypass, under the control of a single actuating element.

Depending on the particular embodiments, the exhaust element includes one or more of the following characteristics:

- the moveable means for shutting off the main pipe are arranged in a region for connecting the bypass to the main pipe, and the moveable shutoff means can be moved between a position for shutting off the main pipe and a position for shutting off the bypass;
- the said mechanical synchronization means are configured, under the control of the single actuating element, to provide successively, during an initial phase, the progressive increasing of the cross section offered for the gases to pass in the bypass, while keeping the main pipe substantially shut off, and, during a later phase, the opening of the main pipe;
- the moveable regulating means include a regulating flap articulated in the bypass and carried by a shaft equipped with means for coupling to the single actuating element, and the moveable shutoff means include a shutoff flap articulated in the main pipe, which shutoff flap is carried by the same shaft as the regulating flap;
- the main pipe includes a seat configured to interact with the shutoff flap for closing off the main pipe, and the seat is extended by a solid wall enveloping the surface described by the free contour of the shutoff flap during the said initial phase of operation under the control of the single actuating element;
- the said moveable shutoff means include a shutoff flap which is moveable in the main pipe, the said means for regulating the cross section offered for the gases to pass include a regulating flap which is moveable in the bypass, and the said synchronization means include means for driving the regulating flap, under the control of the said single actuating element, and means for driving the shutoff flap under the control of the said regulating flap;
- the shutoff flap and the regulating flap are articulated about the same spindle, and the shutoff flap includes a support abutment for the regulating flap, so as to cause the shutoff flap to be driven under the control of the regulating flap, during the movement of the regulating flap bearing on the abutment;
- it includes an elastic means for returning the shutoff flap into the position where it shuts off the main pipe;
- facing the region where the regulating flap moves, the wall of the bypass is spaced away progressively, over at least a part of its length, from the surface described by the free contour of the regulating flap when it is moved from a position restricting the cross section offered for the gases to pass to a position where it clears the cross section offered for the gases to pass;
- the regulating flap is articulated about a spindle and the said wall of the bypass, over at least a part of its length, describes a curved profile diverging around the spindle along the direction of movement of the regulating flap from its position restricting the cross section offered for the gases to pass to its position clearing the cross section offered for the gases to pass;
- the shutoff flap is mounted so as to be moveable from its position shutting off the main pipe to a withdrawn position in which the main pipe is open, along the direction of outflow of the gases in the main pipe; and
- the main pipe includes an expansion compensation element.

BRIEF DESCRIPTION OF THE DRAWINGS

The invention will be better understood on reading the description which will follow, given solely by way of example and by referring to the attached drawings, in which.

DESCRIPTION OF THE PREFERRED EMBODIMENTS

Figure 1:
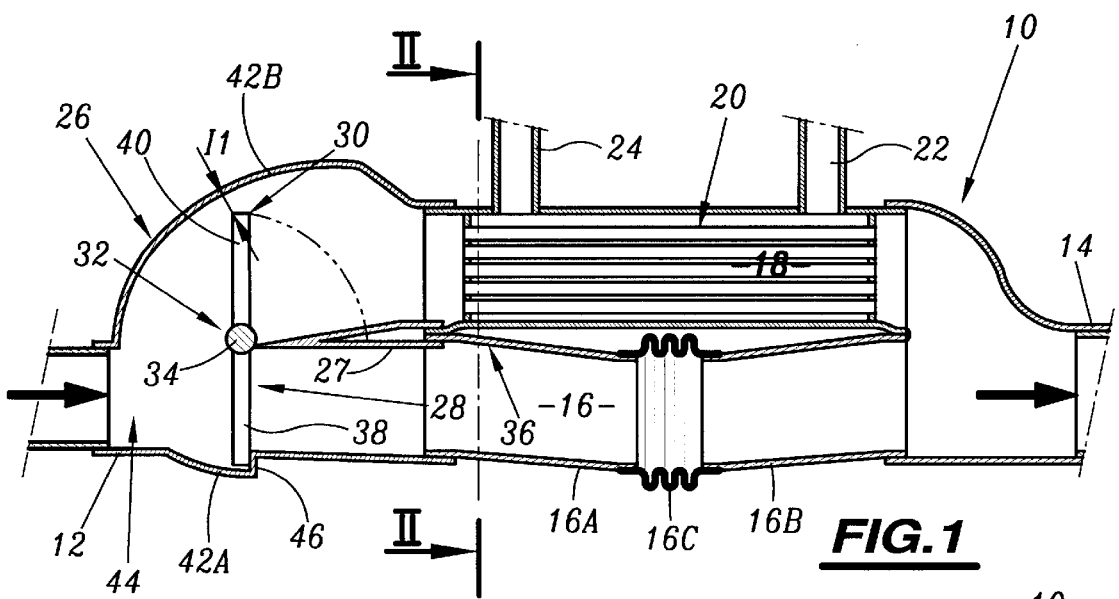
FIG. 1 is a view in longitudinal section of an exhaust element according to the invention represented in its initial position upon starting of the engine.

The exhaust element 10 represented in FIG. 1 is intended to be inserted into an exhaust line of a motor vehicle with an internal-combustion engine. It includes an inlet 12 where the exhaust gases coming from the engine arrive, and an outlet 14 for evacuating the exhaust gases to the atmosphere through other elements of the exhaust line.

The exhaust element includes a main exhaust pipe 16 in the extension of which the inlet 12 and outlet 14 are provided. It further includes a bypass 18 mounted in parallel with the main exhaust pipe 16 between the inlet 12 and the outlet 14.

As represented in FIG. 1, the main pipe 16 and the bypass 18 are each delimited by a cylindrical metal tube having a substantially rectangular cross section with one of its faces curved outwards in a circular arc. The two tubes are placed longitudinally side by side along opposing flat surfaces separated by an air gap.

The main pipe 16 is formed by two successive segments 16A, 16B linked to one another by an expansion compensation element 16C. This element is a metal bellows, for example.

Figure 2:
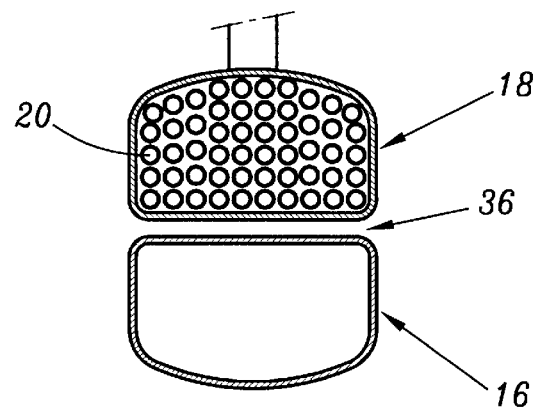
FIG. 2 is a section of the exhaust element of FIG. 1 taken along the line II—II.

The bypass 18 encloses a heat exchanger 20 of counterflow type. It consists of a bundle of tubes which can be seen in FIG. 2. The exchanger 20 is arranged longitudinally in the bypass 18 in contact with the exhaust gases. The bundle of tubes of the exchanger 20 includes an inlet 22 for the cooling fluid coming from the engine and an outlet 24 for the heated cooling fluid sent to the installation for heating the passenger compartment of the vehicle.

The inlet 12 is linked to the main pipe 16 and to the bypass 18 by a diverging adapter 26. The latter includes a central strut 27 in the shape of a pin in cross section. The opposing walls of the main pipe 16 and of the bypass between have their upstream ends held between the two arms of the pin.

In the upstream connecting region, between the bypass 18 and the main pipe 16, delimited by the diverging adapter 26, are arranged moveable means 28 for shutting off the main pipe 16 and moveable means 30 for regulating the cross section offered for the gases to pass in the bypass 18.

According to the invention, the exhaust element 10 includes mechanical means 32 for synchronizing the means 28 for shutting off the main pipe and means 30 for regulating the cross section for the gases to pass. These synchronization means 32 are configured for coupling to a single actuating element, not represented, arranged outside the exhaust element.

In the embodiment of FIGS. 1 to 4, the mechanical synchronization means 32 include a shaft 34 arranged at the end of the strut 27 extending the separation, denoted 36, between the main pipe 16 and the bypass 18. This separation 36 consists of the two side-by-side flat faces of the tubes 16 and 18.

The shaft 34 is mounted so as to be able to rotate perpendicularly to the plane defined by,the main pipe 16 and the bypass 18. One of the ends of the shaft 34 projects outside the exhaust element and includes means for mechanical linking to the single actuating element.

The moveable shutoff means 28 are formed by an articulated flap 38, carried by the shaft 34. The flap 38 is mounted so that it can be moved through the main pipe 16.

Likewise, the means 30 for regulating the cross section for the gases to pass include an articulated flap 40 carried by the shaft 34 and moveable in the bypass 18.

The flaps 38 and 40 are arranged in the same plane on either side of the shaft 34. Each flap has a substantially rectangular shape with a free edge formed in a circular arc and is linked to the shaft 34 along its edge opposite the edge formed in a circular arc.

The upstream diverging adapter 26 is delimited externally by a metal wall 42 of substantially toroidal shape generated by the rotation about the shaft 34 of a circular arc of a diameter slightly larger than that of the main pipe 16.

Hence, outside the connection aperture, denoted 44, of the inlet 12 in the upstream connecting region 26 facing the flap 38, the wall 42 exhibits a solid wall denoted 42A enveloping the surface generated by the free circular-arc contour of the flap 38. This solid wall 42A is extended downstream by a shoulder 46 linking the wall to the main pipe 16.

The shoulder 46 defines a seat configured to interact with the circular-arc contour of the flap 38 and thus to provide substantially leaktight shutting-off of the main pipe 16, as represented in FIG. 1.

In the axis of the bypass 18, the toroidal wall 42 is extended upstream of the exchanger 20 by a divergent curved wall 42B forming an external protuberance. The wall 42B is spaced away progressively from the axis of the articulation shaft 34 along the direction in which the gases pass.

Figure 3:
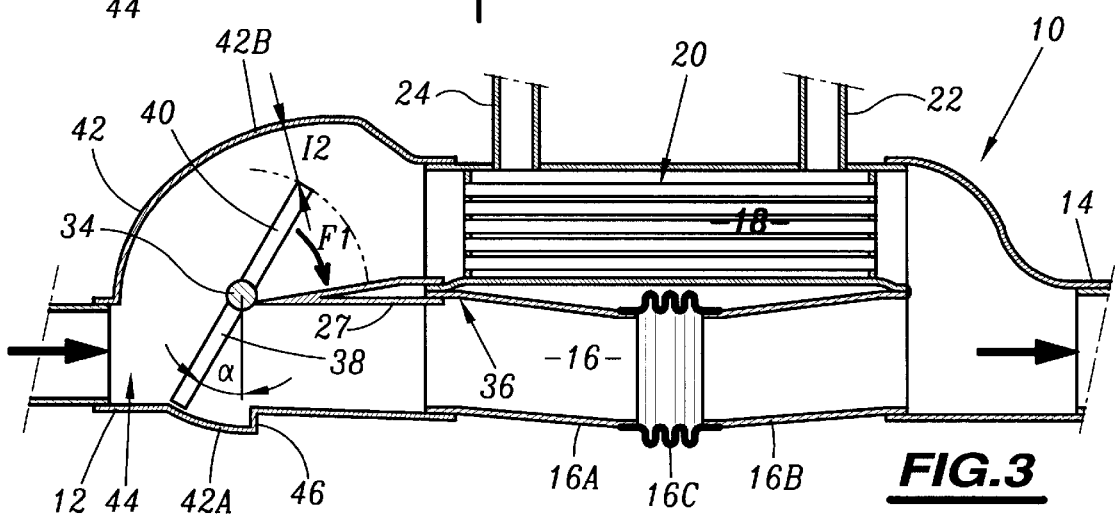
FIGS. 3 and 4 are views in longitudinal section of the exhaust element of FIG. 1 represented at separate control instants subsequent to the starting of the engine.

In particular, as represented in FIGS. 1 and 3, the divergent wall 42B is spaced away progressively from the surface described by the free contour of the regulating flap 40, when it is moved from a position restricting the cross section for the gases to pass (FIG. 1) to a position clearing the cross section for the gases to pass (FIG. 3). This envelope surface is represented in dots and dashes in FIGS. 1 and 3.

In the position represented in FIG. 1, corresponding to the initial position of the flaps 38 and 40, the exhaust gases coming from the engine are constrained to flow through the bypass 18. This is because the shutoff flap 38 is bearing against the seat 46, which prevents the gases passing through the main pipe 16. The gases thus flow through the passage of reduced cross section, denoted I1, delimited between the contour of the regulating flap 40 and the diverging wall 42B, in the region where the wall is close to the shaft 34.

Hence, the gases arriving in the bypass 18 undergo a substantial acceleration, because of the small passage cross section which is offered to them.

Moreover, the complete shutting-off of the main pipe 16 and the presence of the regulating flap 40 on essentially the whole of the cross section for the gases to pass creates a very large loss of pressure head, which leads to a back pressure being created at the outlet from the engine. The engine is thus made to produce increased heat power.

This method of operation of the exhaust element 10 corresponds to the phase of starting an initially cold engine. It allows a rapid increase of the temperature in the engine cooling circuit, by rapid transfer of heat in the exchanger 20, between the gases flowing at high speed and the heat-carrying fluid flowing in the exchanger.

The rotation of the shaft 34 causes concomitant tilting of the flaps 38 and 40 under the control of the single actuating element.

As long as the angle of rotation of the shaft 34 is less than an angle α represented in FIG. 3, the free contour of the shutoff flap 38 follows the solid wall 42A. Hence, the main exhaust pipe 16 is kept closed, despite the flap 38 being lifted off its seat 46. This is because the flap 3B is then flush with the inner surface of the solid wall 42A.

As long as the flap 38 is still shutting off the main pipe 16, the simultaneous tilting of the regulating flap 40 leads to a progressive increase in the cross section offered for the exhaust gases to pass so that they can enter the bypass 18. This is because the distance 12 separating the divergent wall 42B from the free contour of the flap 40 increases progressively as the flap 40 is tilted along the direction of the arrow Fl, because of the flared shape of the wall 42B.

In step with the rise in temperature in the cooling circuit, the single actuating element causes the progressive tilting of the flap 40, so as to reduce the pressure, and thus the heat power from the engine, and so to reduce the thermal transfer in the exchanger. As long as the tilting angle is less than the angle α, the main exhaust pipe 16 is kept shut, so that substantially all the exhaust gases flow through the exchanger 20.

Figure 4:
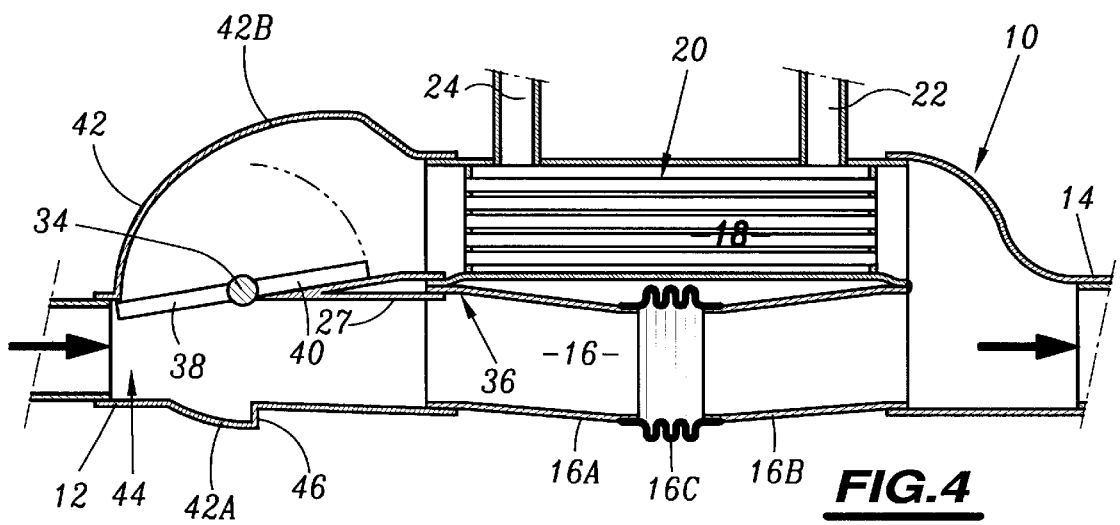

When the temperature in the cooling circuit is judged to be sufficient, the shaft 34 is brought into the position of FIG. 4 under the control of the single actuating element. In this position, the shutoff flap 38 shuts off the inlet of the bypass 18, while the regulating flap 40 is pressed flat against the strut 27.

In this position of the flaps 38 and 40, substantially all of the exhaust gases flow through the main pipe 16. The engine cooling circuit is thus isolated from the exhaust gases flowing in the exhaust element 10. This configuration corresponds to the operation of the vehicle in steady-state conditions, that is to say outside of the phases of starting and/or of low loading on the engine.

It can be understood that, with such a configuration, the function of shutting off the main pipe and the function of regulating the cross section for the gases to pass offered at the inlet of the bypass 18 are carried out by the same mechanical element, which is of simple construction. Hence, the cost of producing the exhaust element is reduced. Moreover, a single control element is sufficient to allow control of the two flaps.

Figure 5:
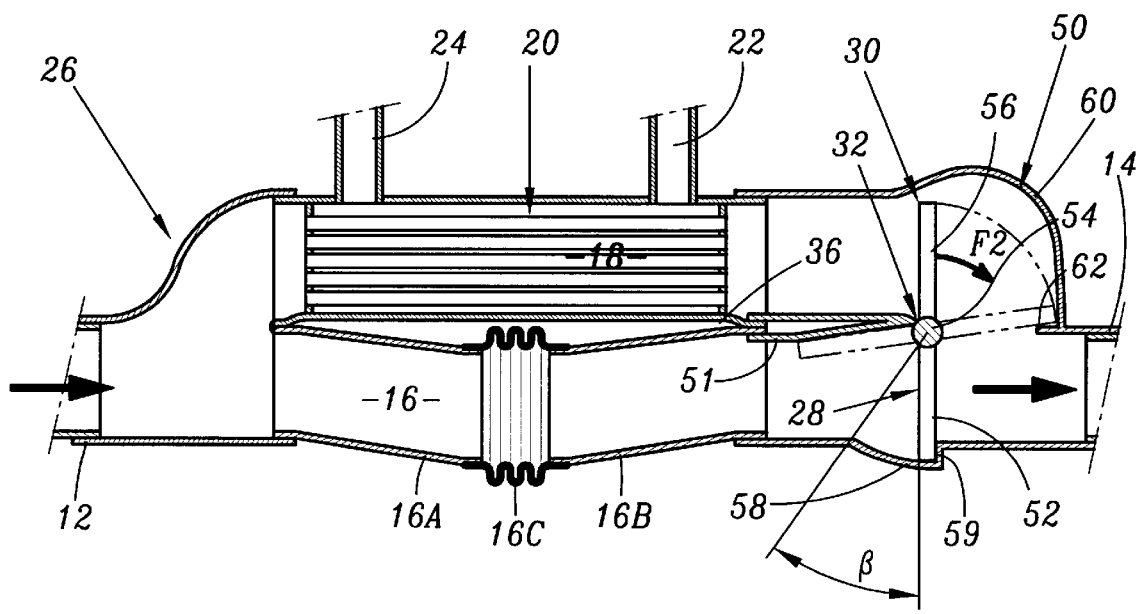
FIG. 5 is a view in longitudinal section of a variant embodiment of the exhaust element of FIG. 1.

A variant embodiment of the exhaust element according to the invention is represented in FIG. 5.

For all the embodiments described, the elements which are identical or similar to those of FIGS. 1 to 4 are designated by the same reference numbers.

Contrary to the embodiment of the preceding Figures, in which the means 28 of shutting off the main pipe and the means 30 of regulating the cross section offered for the gases to pass in the bypass 18 are arranged in the upstream connecting region, these means, in this embodiment, are arranged in the downstream connecting region of the main pipe 16 and of the bypass 18. The latter is delimited by a converging adapter, denoted 50, linking the outlet 14 to the main pipe 16 and to the bypass 18. The converging adapter 50 is separated by a strut 51 in the form of a pin in which the ends of the opposing walls of the pipe 16 and of the bypass 18 are held.

As before, the means of shutting off the pipe 16 include a flap 52, carried by a rotating shaft 54 arranged at the downstream end of the separation 36 formed by the strut 51. The means 30 of regulating the cross section offered for the gases to pass includes a regulating flap 56 articulated in the bypass 19 downstream of the exchanger 20.

The regulating flap 56 is carried by the shaft 54 in the extension of the shutoff flap 52. The flaps 52 and 56 both have a rectangular shape with one side formed in a circular arc as in the preceding embodiment. They are coupled in the same plane on either side of the shaft 54 along one side opposite the circular-arc side.

The inwardly curved wall of the converging adapter 50 extending the main pipe 16 is deformed where it faces the free contour of the flap 52. Hence, it includes a solid wall 58 enveloping the surface generated by the free circular-arc contour of the flap 52, for a limit angle of rotation β of the latter about the shaft 54. The solid wall 58 is linked downstream to the coursing part of the converging adapter 50 by a shoulder 59 constituting a seat on which the shutoff flap 52 bears when it is in its initial position.

The inwardly curving wall of the connecting region 50 arranged facing the free contour of the regulating flap 56 exhibits an external swelling. It is deformed outwards in order to form a divergent curved wall 60 spaced away progressively from the shaft 54 along the direction of tilting of the flap 56 indicated by the arrow F2. In particular, the divergent wall 60 is spaced away progressively from the surface described by the free contour of the flap 56 when the shaft 54 rotates by an angle β.

In the extension of the strut 51, the connecting region delimited by the diverging adapter 50 is limited internally by a flange 62 constituting a seat on which the regulating flap 56 bears.

In this embodiment, like the preceding one, it can be understood that, when the flaps 52 and 56 are in their initial position, represented in solid lines in FIG. 5, the flap 52, bearing on the seat 59, guarantees complete shutting-off of the main pipe 16. The regulating flap 56 then, with the diverging wall 60, delimits a passage of reduced cross section for the exhaust gases flowing through the bypass 18.

For angles of tilting of the shaft 54 less than the limit angle β, the flap 52 keeps the main pipe 16 shut off. This is because the free edge of the flap 52 is then arranged along the solid wall 58 forming an envelope. In step with the tilting of the shaft 54, and for an angle less than the angle β, the gap between the free edge of the regulating flap 56 and the diverging wall 60 progressively increases, which increases the cross section offered for the gases to pass through the bypass 18.

When the engine is operating in steady-state conditions, the regulating flap 56 is folded back onto the flange 62 as represented in dots and dashes in FIG. 5. It then shuts off the bypass 18 downstream of the exchanger 20. In this position, the shutoff flap 52 is pressed flat against the separation wall 36, so that the exhaust gases are free to flow through practically the whole of the cross section of the main pipe 16.

In this embodiment, as in the preceding one, the construction and the control of the means 28 for shutting off the main pipe and of the means 30 for regulating the passage cross section offered to the gases are very simple.

Figure 6:
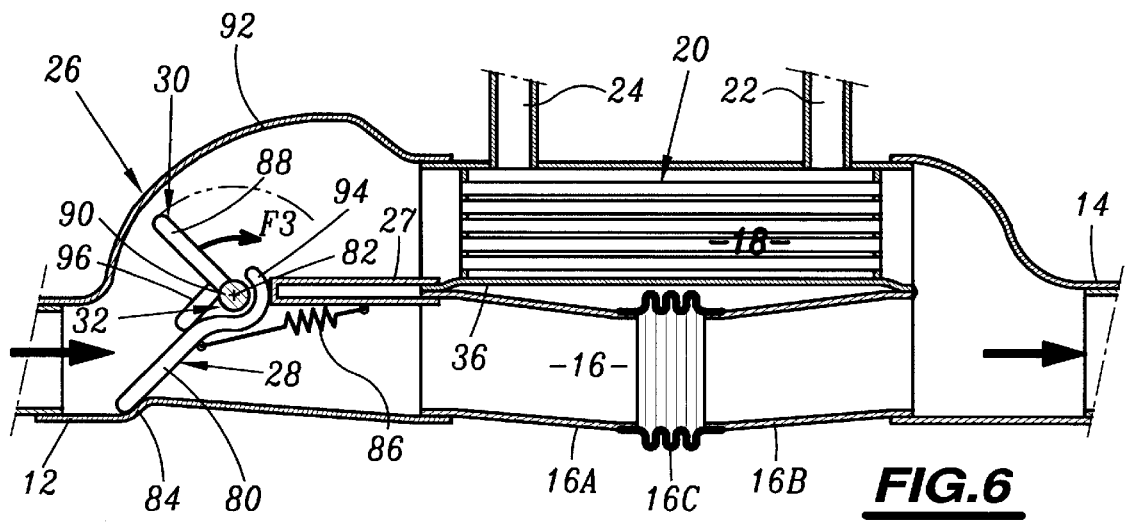
FIGS. 6, 7 and 8 are views in longitudinal section of yet another variant embodiment of an exhaust element according to the invention, represented at successive control instants.
Figure 7:
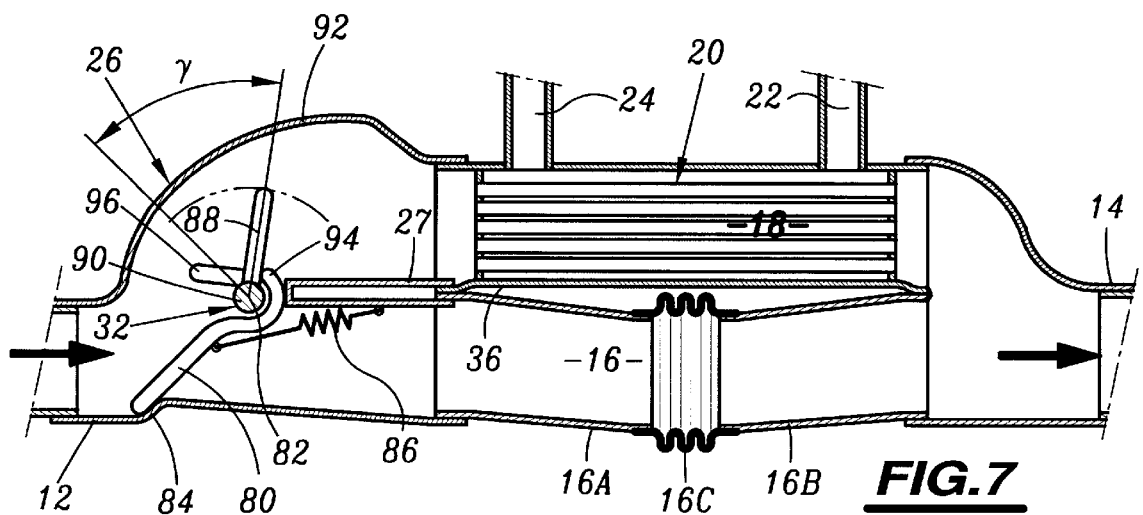
Figure 8:
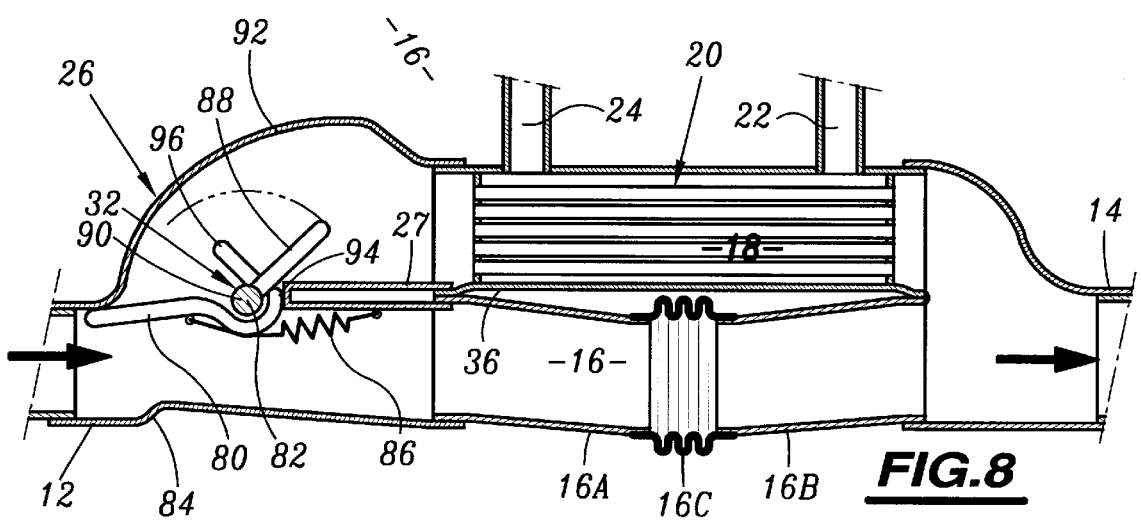

In the variant embodiment of FIGS. 6 to 8, the means 28 for shutting off the main pipe 16 and the means 30 for regulating the cross section offered for the gases to pass in the bypass 18 are arranged in the diverging adapter 26 delimiting the upstream region for connecting the main pipe 16 to the bypass 18.

In this embodiment, the means 28 for shutting off the main pipe 16 include a shutoff flap 80 mounted freely articulated about a spindle 82 provided at the upstream end of the separation 36. The flap 80 extends perpendicularly to the plane defined by the main pipe 16 and the bypass 18.

The diverging adapter 26, upstream of the main pipe 16, includes a deformation 84 in its inwardly curved wall forming a seat on which the contour of the flap 80 bears.

The flap 80 is held pressed against the seat 84 by means of an elastic means 86 consisting, for example, of a helical spring. One end of the latter is fixed to the strut 36 and the other end is fixed to the flap 80.

The means 30 for regulating the cross section offered for the gases to pass in the bypass 18 include a flap 89 carried by a shaft 90 extending along the spindle 82. The shaft 90 includes means for coupling to a single actuating element arranged outside the exhaust element.

The inwardly curved wall of the diverging adapter 26 exhibits, upstream of the bypass 18, an external swelling defining a domed divergent wall 92 spaced away progressively from the spindle 82 as it approaches the exchanger 20.

In its articulation region about the shaft 90, the shutoff flap 80 includes an abutment 94 arranged to the rear of the flap 88, considering the direction of articulation thereof. In the initial position represented in FIG. 6, the abutment 94 is spaced by an angle from the flap 88.

Moreover, the flap 88 includes an arm 96 for bringing the flap 80 back into its position for shutting off the main pipe. This arm 96 extends perpendicularly to the flap 88, on the gas-intake side. It is configured to interact in certain positions of the flap 88 with the upstream face of the shutoff flap 80.

When the engine is started up, the flap 80, subject to the tension of the spring 86, is bearing on the seat 84. It then completely shuts off the main pipe 16. The regulating flap 88 is arranged facing a region of the divergent wall 92 which is close to the spindle 82. Hence, the cross section offered for the gases to pass through the bypass 18 is reduced.

In this position, the arm 96 is applied against the upstream face of the shutoff flap 80.

In order to increase this passage cross section, the shaft 90 bearing the flap 88 is moved through an angle, which leads to the regulating flap 88 being tilted along the direction of the arrow F3. The latter then, as represented in FIG. 7, is located facing a region of the divergent wall 92 spaced away from the shaft 82. Hence, the cross section offered for the gases to pass can be progressively and selectively increased.

As long as the flap 88 is spaced away from the abutment 94, the shutoff flap 80 continues to bear on the seat 84 under the action of the tension of the spring 86.

For a rotation of the regulating flap 88 greater than a limit angle y, the flap comes to bear on the abutment 94. When it subsequently tilts, it then draws along the shutoff flap 80 with it, which leaves its support on the seat 84. The continued tilting of the regulating flap 88 leads to the shutoff flap passing from its position for shutting off the main pipe 16, as represented in FIG. 7, to a position where it shuts off the bypass 18, as represented in FIG. 8. The shutoff flap then bears on the edge of the divergent wall 92.

For control of the single actuating element in the opposite direction, the flap 88 can be brought back into a previous position. In particular, when the shutoff flap 80 is no longer impelled by the regulating flap 88, the latter resumes its position for shutting off the main pipe 16 under the action of the spring 86.

In the event of the spring 86 breaking, the arm 96, bearing on the flap 80, causes the latter to tilt towards its shutoff position, when the flap 88 is brought into its position of FIG. 6, in which it restricts the cross section for the gases to pass in the bypass 16. Hence, even in the event of the spring 86 breaking, the device can function in a degraded mode.

In this embodiment, the shutting-off of the main pipe 16 and the regulation of the cross section for the gases to pass in the bypass 18 are obtained easily and at low cost. Moreover, these two means are controlled by a single actuator.

Figure 9:
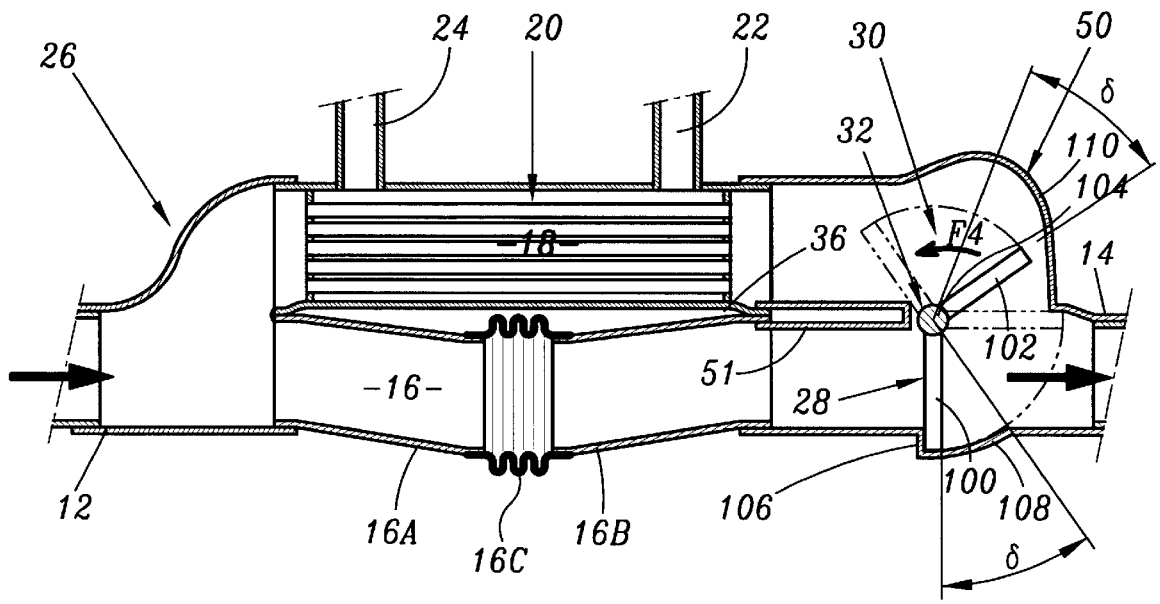
FIGS. 9 and 10 are sectional views of two further variant embodiments of an exhaust element according to the invention.
Figure 10:
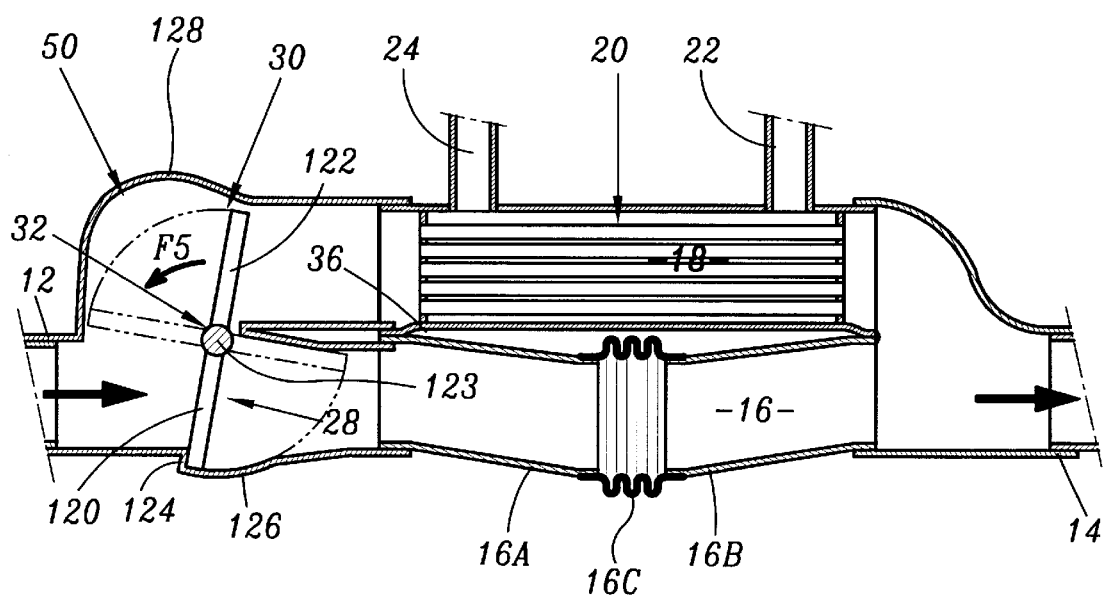

Two embodiments of the exhaust element according to the invention are represented in FIGS. 9 and 10, allowing operation of the vehicle even in the event of degradation of the single control element actuating the moveable regulating means 28 and the moveable shutoff means 30.

To this end, in the two variants, the shutoff flap 30 is moved from its shutoff position counter to the direction of the gas flow in the main pipe. Hence, in the event of the single control element breaking, the exhaust gases flowing in the main pipe tend to push the shutoff flap towards its withdrawn position, in which the pipe 16 is open, allowing the exhaust line of the vehicle to operate in degraded mode.

More precisely, the exhaust element of FIG. 9 is substantially similar to that of FIG. 5, the shutoff means 28 and the means 30 for regulating the passage cross section being arranged in the converging adapter 50 arranged downstream of the main pipe 16 and of the bypass 18.

These means are formed respectively by articulated flaps 100, 102 carried by a single shaft 104 forming the synchronization means 32.

The flaps 100 and 102 define an angle of about 120°. The wall of the converging adapter 50 extending the main pipe 16 exhibits a hollow comprising successfully, in the direction of gas outflow, a shoulder 106 extended by a toroidal wall 108 centred on the shaft 104. The wall 108 is defined by the envelope generated by the free contour of the shutoff flap 100.

Facing the regulating flap 102, the wall, denoted 110, of the converging adapter 50 is spaced away progressively from the shaft 104, in the anti-clockwise direction, for an angular range δ corresponding to the angular extent of the toroidal wall 108.

Hence, when the regulating flap 102 moves in the direction of the arrow F4, the cross section offered for the gases to pass in the bypass 18 progressively increases.

In this embodiment, as in the preceding ones, when the shutoff flap is pressed firmly against the seat formed by the shoulder 106, the exhaust gases flow only in the bypass 18 and a high back pressure is created downstream of the engine.

For angles of tilting of the flaps 100 and 102 less than δ, the main pipe remains shut off and the cross section offered to the gases in the bypass 18 progressively increases, reducing the loss of pressure head created.

For a tilting of the flaps by an angle greater than the angle δ, and particularly equal to 90°, the shutoff flap 100 shuts off the outlet from the bypass 18, as represented in dots and dashes in FIG. 9. In this position, the flap 100 allows the gases to pass on the entire cross section of the main pipe 16.

It will be understood that with the shutoff flap 100 being moveable from its shutoff position towards its position where the main pipe 16 is open, along the direction of outflow of the exhaust gases in the main pipe 16, in the event of a breakage of the control of the shaft 104, the flap 100 will be held by the exhaust gases in a position allowing the gases to pass through the main pipe 16.

The embodiment of FIG. 10 is substantially similar to that of FIGS. 1 to 4. However, the shutoff and regulation flaps, denoted 120 and 122, carried by a shaft 123, are articulated in opposite directions from their initial position to their final position.

Hence, the shoulder denoted 124 for supporting the shutoff flap 120 and the toroidal wall 126 are arranged successively along the direction of outflow of the exhaust gases.

Likewise, the divergent wall denoted 128, provided in front of the bypass 18, is spaced away progressively from the shaft carrying the flaps along the direction of the arrow F5.

It can be seen that, in this embodiment also, in the event of a breakage of the control element, the exhaust gases cause the main pipe 16 to open by tilting of the shutoff flap 120 along the direction of the arrow F5.

What is claimed is:

1. An exhaust element (10) of the type including a main exhaust pipe (16) and a bypass (18) mounted in parallel with the main pipe (16), which bypass (18) includes a heat exchanger (20), and in which are arranged moveable shutoff means (28) for shutting off the main pipe (16) and moveable means (30) for regulating the cross section offered for the gases to pass in the bypass (18); and characterized in that said exhaust element includes mechanical means (32) for synchronizing the moveable shutoff means (28) for shutting off the main pipe (16) and said moveable means (30) for regulating the cross section for the gases to pass in the bypass (18), under the control of a single actuating element and in that said mechanical synchronization means (32) are configured, under the control of the single actuating element, to provide successively, during an initial phase, the progressive increasing of the cross section offered for the gases to pass in the bypass (18), while keeping the main pipe (16) substantially shut off, and, during a later phase, the opening of the main pipe (16).

2. The exhaust element according to claim 1, characterized in that the moveable means (28) for shutting off the main pipe (16) are arranged in a region (26) for connecting the bypass (18) to the main pipe (16), and in that the moveable shutoff means (28) can be moved between a position for shutting off the main pipe (16) and a position for shutting off the bypass (18).

3. The exhaust element according to claim 1, characterized in that the moveable regulating means (30) include a regulating flap (40; 56; 102; 122) articulated in the bypass (18) and carried by a shaft (34; 54; 104; 123) equipped with means for coupling to the single actuating element, and in that the moveable shutoff means (28) include a shutoff flap (38; 52; 100; 120) articulated in the main pipe (16), which shutoff flap (38; 52; 100; 120) is carried by the same shaft (34; 54; 104; 123) as the regulating flap (40; 56; 102; 122).

4. The exhaust element according to claim 3, characterized in that the main pipe (16) includes a seat (46; 59; 106; 124) configured to interact with the shutoff flap (38; 52; 100; 120) for closing off the main pipe (16), and in that the seat (46; 59; 106; 124) is extended by a solid wall (42A; 58; 108; 126) enveloping the surface described by the free contour of the shutoff flap (38; 52; 100; 120) during the said initial phase of operation under the control of the single actuating element.

5. The exhaust element according to claim 1 characterized in that said moveable shutoff means (28) include a shutoff flap (80) which is moveable in the main pipe (16), said means (30) for regulating the cross section offered for the gases to pass include a regulating flap (88) which is moveable in the bypass (18), and in that said mechanical synchronization means (32) include means (90) for driving the regulating flap (88) under the control of said single actuating element, and means for driving the shutoff flap (80) under the control of said regulating flap (88).

6. The exhaust element according to claim 5, characterized in that the shutoff flap (80) and the regulating flap (88) are articulated about the same spindle (82), and in that the means for driving the shutoff flap (80) includes a support abutment (94) for the regulating flap (88), so as to cause the shutoff flap (80) to be driven under the control of the regulating flap (88), during the movement of the regulating flap (88) bearing on the abutment (94).

7. The exhaust element according to claim 5, further including an elastic means (86) for returning the shutoff flap (80) into the position where the shutoff flap shuts off the main pipe (16).

8. The exhaust element according to claim 1, characterized in that, facing the region where the regulating flap (40; 56; 88; 102; 122) moves, the wall (42B; 60; 92; 110; 128) of the bypass (18) is spaced away progressively, over at least a part of its length, from the surface described by the free contour of the regulating flap (40; 56; 88; 102; 122) when it is moved from a position restricting the cross section offered for the gases to pass to a position where it clears the cross section offered for the gases to pass.

9. The exhaust element according to claim 8, characterized in that the regulating flap (40; 56; 88; 102; 122) is articulated about a spindle (34; 54; 82; 104; 123) and in that the said wall of the bypass (18), over at least a part of its length, describes a curved profile diverging around the spindle (34; 54; 82; 104; 123) along the direction of movement of the regulating flap (40; 56; 88; 102; 122) from the position restricting the cross section offered for the gases to pass to a position clearing the cross section offered for the gases to pass.

10. The exhaust element according to claim 1, characterized in that the shutoff flap (100; 120) is mounted so as to be moveable from a position shutting off the main pipe (16) to a withdrawn position in which the main pipe (16) is open, along the direction of outflow of the gases in the main pipe (16).

11. The exhaust element according to claim 1, characterized in that the main pipe (16) includes an expansion compensation element (16C).

* * * * *